(12) United States Patent
Nilsson

(10) Patent No.: US 9,777,581 B2
(45) Date of Patent: Oct. 3, 2017

(54) IMPINGEMENT COOLING OF TURBINE BLADES OR VANES

(75) Inventor: Ulf Nilsson, Whetstone (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 475 days.

(21) Appl. No.: 14/343,855

(22) PCT Filed: Sep. 3, 2012

(86) PCT No.: PCT/EP2012/067138
§ 371 (c)(1),
(2), (4) Date: Mar. 9, 2014

(87) PCT Pub. No.: WO2013/041361
PCT Pub. Date: Mar. 28, 2013

(65) Prior Publication Data
US 2014/0219788 A1 Aug. 7, 2014

(30) Foreign Application Priority Data
Sep. 23, 2011 (EP) .................................... 11182554

(51) Int. Cl.
*F01D 5/18* (2006.01)
*B23P 11/02* (2006.01)

(52) U.S. Cl.
CPC .............. *F01D 5/188* (2013.01); *B23P 11/02* (2013.01); *F01D 5/189* (2013.01); *B23P 2700/06* (2013.01); *F05D 2230/60* (2013.01); *F05D 2260/201* (2013.01); *Y10T 29/49872* (2015.01)

(58) Field of Classification Search
CPC ....... F01D 5/188; F01D 5/189; B23P 2700/06
USPC ........................................................ 416/96 A
See application file for complete search history.

(56) References Cited

U.S. PATENT DOCUMENTS

| 4,056,332 | A |   | 11/1977 | Meloni |            |
|-----------|---|---|---------|--------|------------|
| 4,252,501 | A | * | 2/1981  | Peill  | F01D 5/189 |
|           |   |   |         |        | 415/115    |
| 4,257,734 | A | * | 3/1981  | Guy    | F01D 9/041 |
|           |   |   |         |        | 415/115    |

(Continued)

FOREIGN PATENT DOCUMENTS

EP  1059418 A2  12/2000
EP  1380725 A2   1/2004

*Primary Examiner* — Gregory Anderson
*Assistant Examiner* — Juan G Flores
(74) *Attorney, Agent, or Firm* — Beusse Wolter Sanks & Maire

(57) ABSTRACT

The present invention relates to a turbine assembly with a basically hollow aerofoil, having at least a cavity with an inner wall and having at least an aperture providing access to the cavity, and at least a first impingement device arrangeable within the cavity. The at least first impingement device is self-locking, resilient and preloadable and has at least one locking element to lock the at least first impingement device in place in the cavity via a force fit between the at least one locking element and the inner wall of the cavity wherein the locking element of the at least first impingement device is embodied as a protrusion extending in an assembled state of the at least first impingement device in the cavity basically perpendicular to a surface of a side wall of the at least first impingement device in a direction towards the inner wall.

20 Claims, 8 Drawing Sheets

(56) References Cited

U.S. PATENT DOCUMENTS

| | | | |
|---|---|---|---|
| 5,516,260 A | 5/1996 | Damlis | |
| 5,533,864 A * | 7/1996 | Nomoto | F01D 5/186 415/115 |
| 6,435,813 B1 * | 8/2002 | Rieck, Jr. | F01D 5/188 415/115 |

* cited by examiner

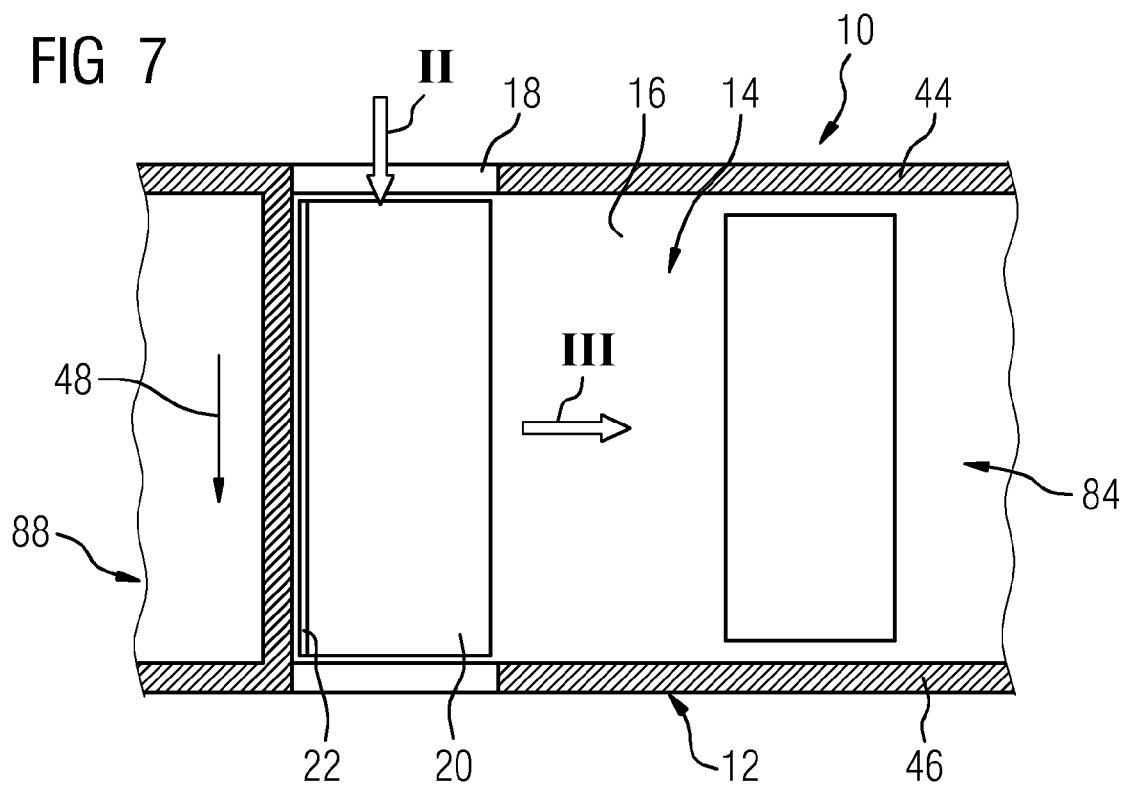
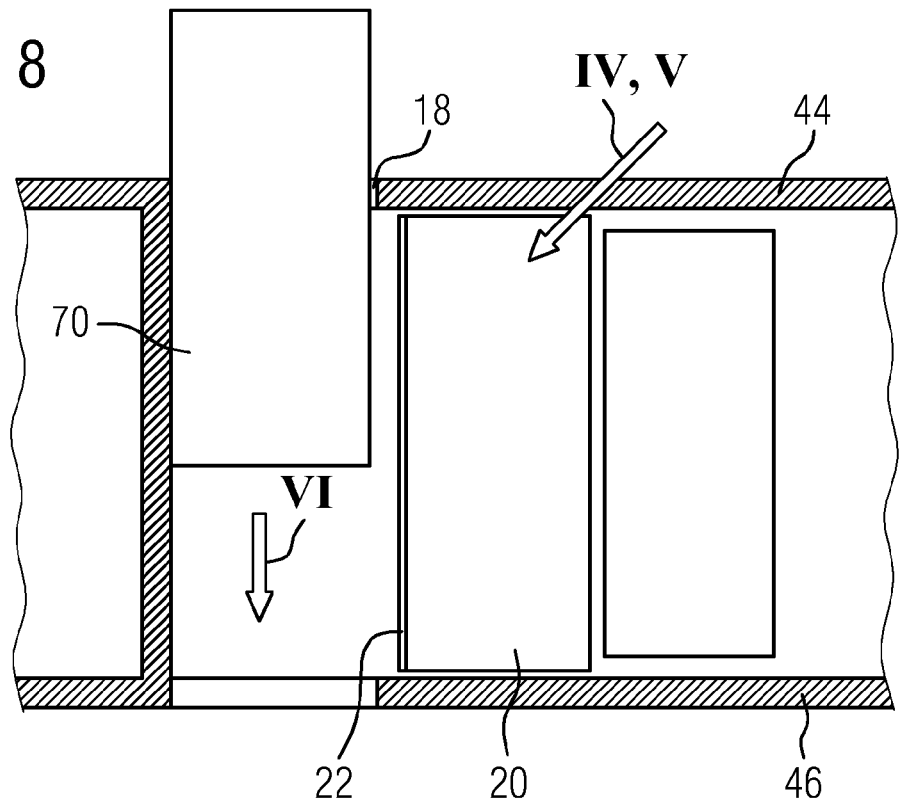

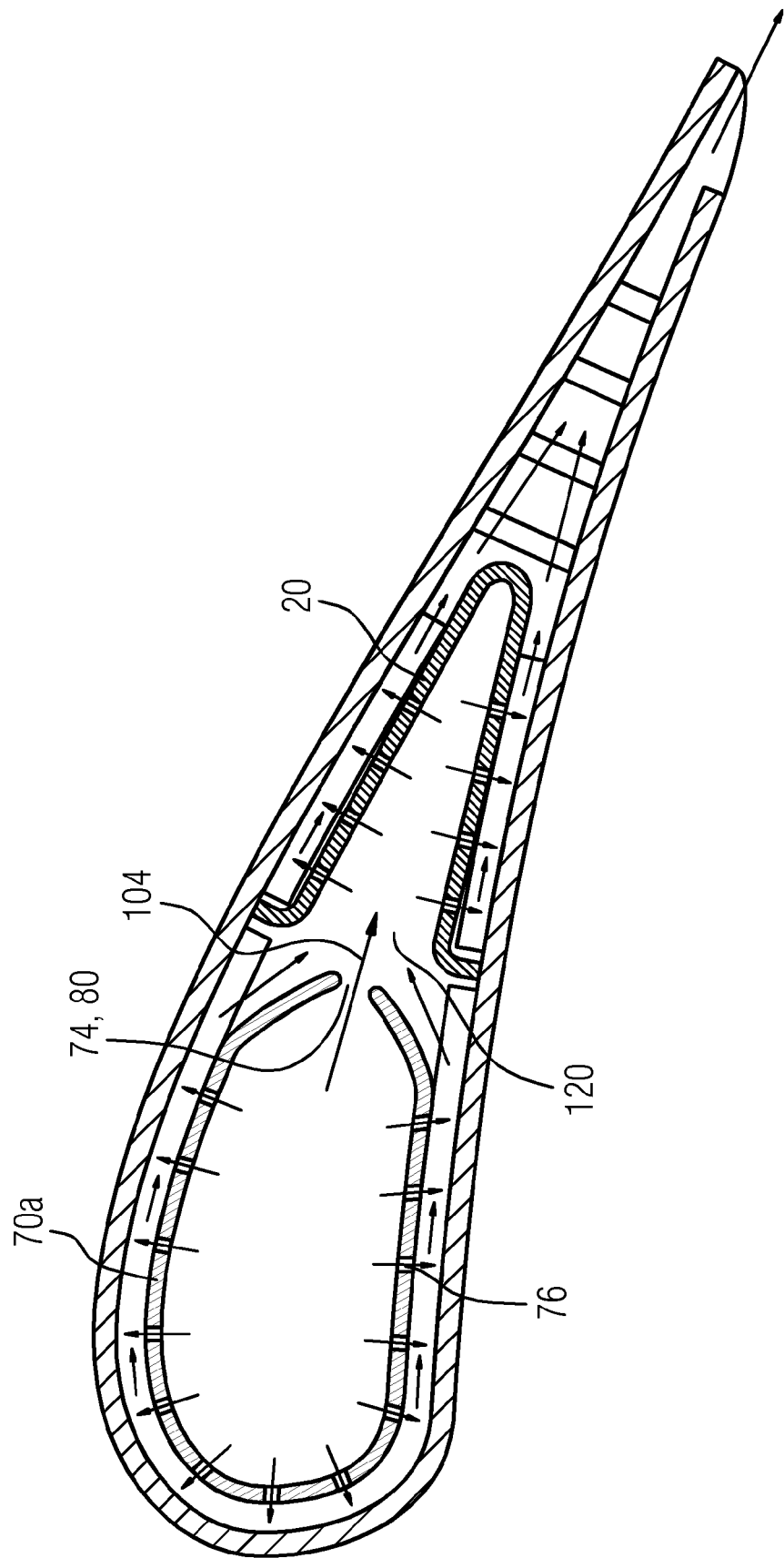

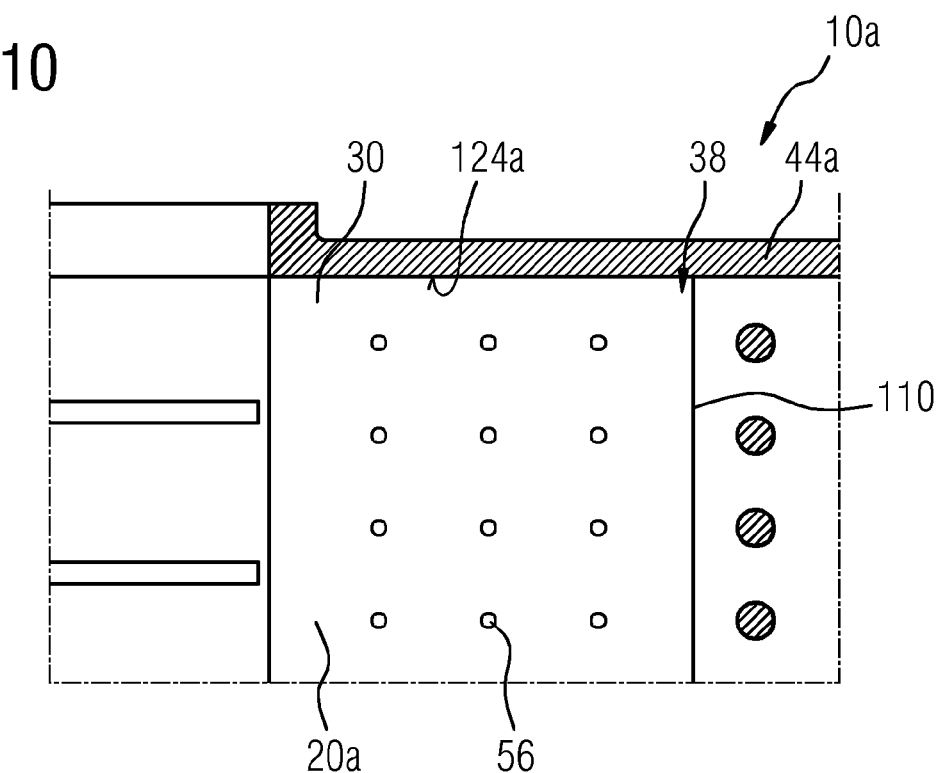
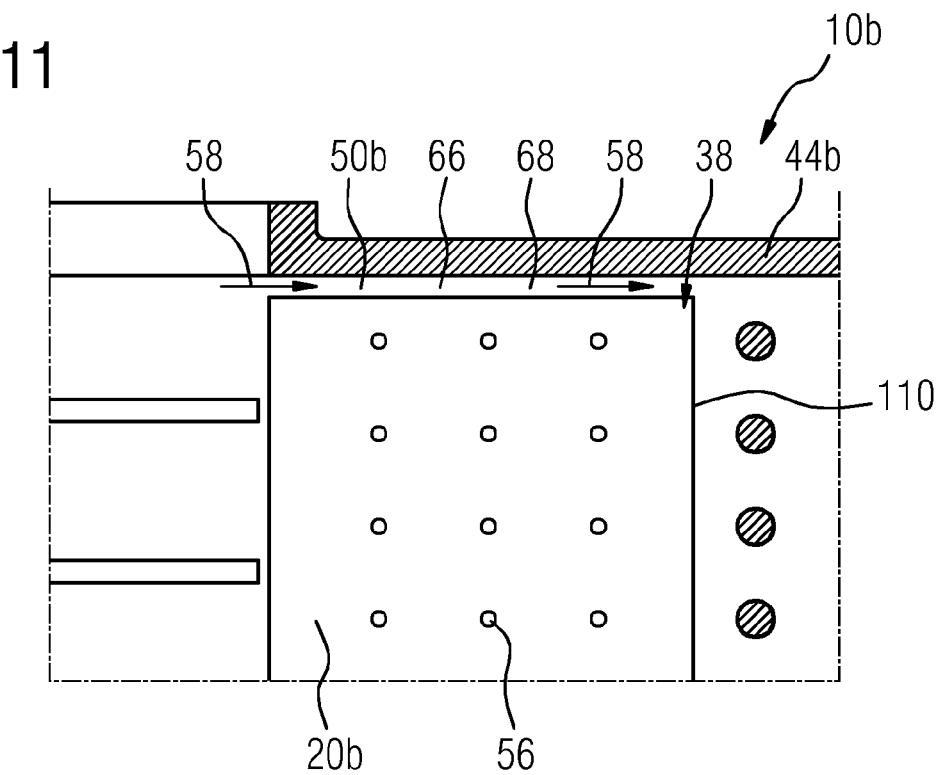

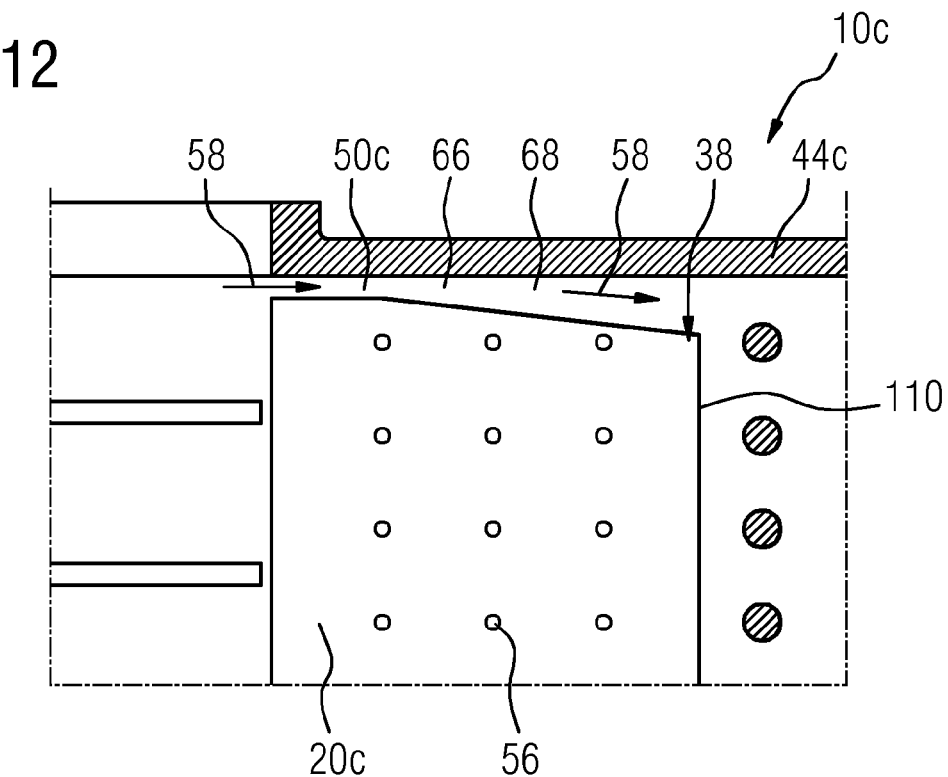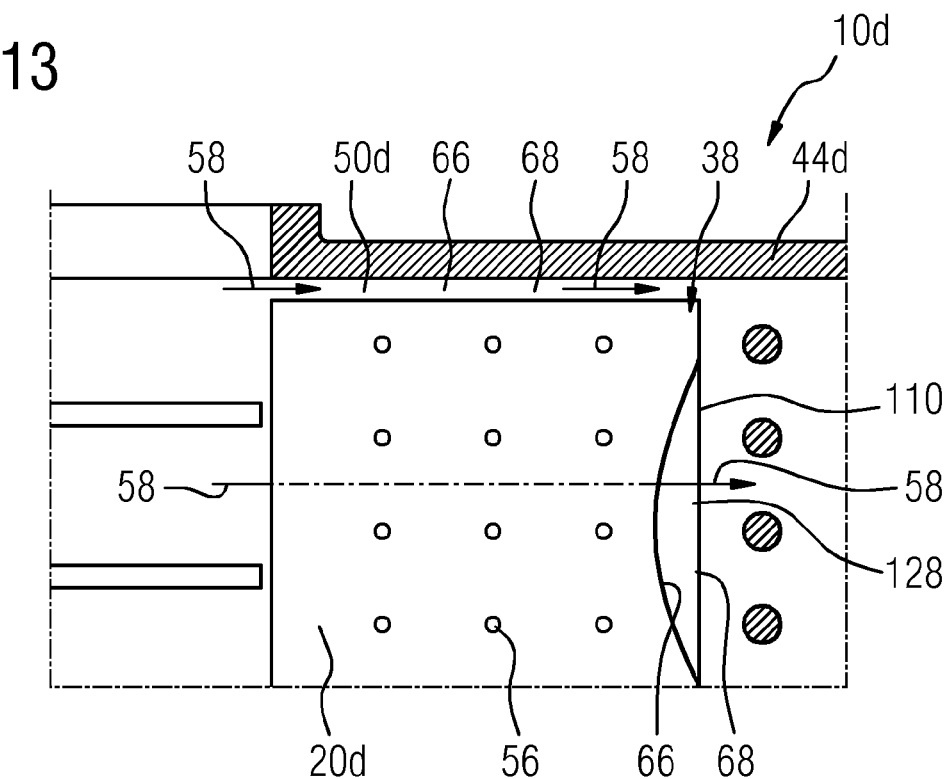

IMPINGEMENT COOLING OF TURBINE BLADES OR VANES

CROSS REFERENCE TO RELATED APPLICATIONS

This application is the US National Stage of International Application No. PCT/EP2012/067138 filed Sep. 3, 2012, and claims the benefit thereof. The International Application claims the benefit of European Application No. EP11182554 filed Sep. 23, 2011. All of the applications are incorporated by reference herein in their entirety.

FIELD OF THE INVENTION

The present invention relates to an aerofoil-shaped turbine assembly such as turbine rotor blades or stator vanes. The present invention further relates to a method for assembling an impingement device in such assemblies.

BACKGROUND TO THE INVENTION

Modern turbines often operate at extremely high temperatures. The effect of temperature on the turbine blades and/or stator vanes can be detrimental to the efficient operation of the turbine and can, in extreme circumstances, lead to distortion and possible failure of the blade or vane. In order to overcome this risk, high temperature turbines may include hollow blades or vanes incorporating so-called impingement devices for cooling purposes.

These impingement devices e. g. so-called impingement plates or impingement tubes are perforated thin wall structures often made of sheet metal that covers surfaces of the blades or vanes that face the opposite side of the wall of the blade or vane exposed to the hot combustion gases. The impingement tubes are hollow tubes that run radially within the blades or vanes. A coolant e. g. air is forced into and along these tubes and emerges through suitable apertures into a void between the tubes and interior surfaces of the hollow blades or vanes. This creates an internal air flow for cooling the blade or vane.

From patent publication EP 1 380 725 A2 an aerofoil with different box- or shell-shaped bodies as impingement devices is known. To fix them in place one of the bodies is brazed to a retaining member and the latter is brazed to the aerofoil.

Problems arise due to a complex and time consuming assembly process and fault positioning of the impingement devices.

EP 1 059 418 A2 and U.S. Pat. No. 4,257,734 A disclose aerofoils with impingement devices. The impingement devices show flutes/corrugations engaging wall grooves at inner walls of the aerofoils to fix them in place.

SUMMARY OF THE INVENTION

It is a first objective to provide an advantageous aerofoil-shaped turbine assembly such as a turbine rotor blade or a stator vane in which the above-mentioned shortcomings can be mitigated, and especially a more thermo-dynamically efficient aerofoil and gas turbine component is facilitated.

A second objective is to provide an advantageous impingement device used in such an assembly for cooling purposes. It is a third objective to provide a method for assembling an impingement device in a hollow aerofoil of an aerofoil-shaped turbine assembly such as a turbine rotor blade or stator vane.

Accordingly, a turbine assembly is provided comprising a basically hollow aerofoil, having at least a cavity with an inner wall and having at least an aperture providing access to the cavity, and at least a first impingement device arrangeable within the cavity.

It is provided that the at least a first impingement device is self-locking, resilient and preloadable and has at least one locking element to lock the at least first impingement device in place in the cavity via a force fit between the at least one locking element and the inner wall of the cavity wherein the locking element of the at least first impingement device is embodied as a protrusion extending in an assembled state of the at least first impingement device in the cavity basically perpendicular to a surface of a side wall of the at least first impingement device in a direction towards the inner wall.

Due to the inventive matter an impingement device could be provided, which could be easily locked in the hollow aerofoil and thus the turbine assembly could be assembled effortlessly. Consequently, no additional pieces are needed to fasten this first impingement device into place or position. Hence, costs for pieces and assembly could be spared. Moreover, complex mechanisms for positioning and clamping of the first impingement device are avoided. Further, an alignment of the first impingement device in the aerofoil could be accomplished without high constructive efforts.

A turbine assembly is intended to mean an assembly provided for a turbine, like a gas turbine, wherein the assembly possesses at least an aerofoil. Preferably the turbine assembly is a turbine aerofoil assembly—in particular a stator vane assembly or a rotor blade assembly—or a turbine nozzle comprising an aerofoil. Preferably, the turbine assembly has a turbine cascade with circumferential arranged aerofoils and an outer and an inner platform arranged at opponent ends of the aerofoil(s). In this context a "basically hollow aerofoil" means an aerofoil with a casing or shell or body, wherein the casing (or shell or body) encases or surrounds at least one cavity. A structure, like a rib or a partitioning wall, which divides different cavities in the aerofoil from one another and for example extends in a span wise direction of the aerofoil, does not hinder the definition of "a basically hollow aerofoil". Preferably, the aerofoil is hollow. In particular, the basically hollow aerofoil, referred as aerofoil in the following description, has at least two cooling regions, an impingement cooling region at at least a leading edge of the aerofoil and a state of the art pin-fin/pedestal cooling region at the trailing edge.

Advantageously, the hollow aerofoil comprises a single cavity. But embodiments of the invention could also be realized for a hollow aerofoil comprising two or more cavities. An "inner wall" is intended to mean a wall which builds an outer perimeter of the cavity and/or which has an inner surface that faces the cavity. Preferably, the surface of the inner wall is arranged basically in parallel to the span wise direction of the aerofoil and/or basically in parallel to a plane extending in span wise direction and from the leading edge to the trailing edge of the aerofoil. An actual wall thickness of the aerofoil is approximately constant along its entire circumference. Preferably at least a spacer is embodied integral with the inner wall to strengthen the wall of the aerofoil. In this context "embodied integral" is intended to mean that the inner wall and the spacer are moulded out of one piece and/or that the inner wall and the spacer could only be separate with loss of function for at least one of the parts. Features and/or functions which are described in reference to the inner wall in the following description could also be applied to a spacer. Further, also fin-pin pedestals could be embodied integral with the inner wall. An "aperture" is intended to mean an opening, a cut and/or a hole, especially a through hole, which is intended, primed, designed and/or embodied for an insertion of at least an impingement device into the aerofoil or its cavity, respectively. Thus, the aperture and the impingement device are matched to one another, for example in respect to size, material properties or the like, to allow the insertion of the impingement tube.

An "impingement device" may be any structure feasible for a person skilled in the art that is able to provide an impingement for a cooling medium, like air. It could be embodied e.g. as a rectangular, oval or circular tube or a hollow structure, like a bowl, a cup and/or a wedge, with an opening. The "at least impingement device" is referred to as "first impingement device" in the following description. The cooling medium enters the first impingement device in an operating mode through the aperture of the aerofoil. Advantageously, the first impingement device extends substantially completely through a span of the aerofoil resulting in an effective cooling of the aerofoil. But it is also conceivable that the first impingement device may extend only through a part of the span of the aerofoil.

The term "preloadable" should also be understood as "biased or having a preload", "self-locking" as "self-clamping", "resilient" as "elastic, springy or compressible" and "force fit" as "force closure or frictional connection".

Preferably, the inner wall has at least a locking structure for the locking mechanism with the locking element. The locking structure could be embodied as any means stated for the locking element above. Hence, a secure locking could be provided. The looking structure also has a second function, apart from keeping the impingement device in position and that is to reduce the leakage around the impingement device directing more of the air passing through the apertures in the impingement device and hence providing a more efficient impingement cooling. Advantageously, the locking element of the first impingement device and the locking structure of the inner wall engage at least with each other via a form fit. This results in a proper alignment of the first impingement device in the aerofoil and a failure-safe positioning. Due to the need of an engagement of the locking element and the locking structure, they had to be primed to correspond to each other, like a key lock principle. They could e.g. be embodied as two protrusions extending towards each other or as a hole or recess with a corresponding protrusion or two interacting poles of a magnet.

Due to the locking element being embodied as a protrusion the locking element could be manufactured with less effort. A protrusion means a section of the first impingement device that is oriented in a direction which deflects from a main extension of the first impingement device with an angle of more than 30°, advantageously more than 45° and preferably more than 60°. The main extension preferably represents an axis of symmetry of the first impingement device, especially of a base body of the first impingement device, wherein a "base body" in this context is intended to mean a structure that substantially imparts a shape and/or form of the first impingement device.

The protrusion extends in an assembled state of the first impingement device in the cavity basically perpendicular to the surface of the side wall of the first impingement device in a direction towards the inner wall. Hence, a locking element with a sufficient retention force could be provided. With a perpendicular orientation a friction-less engagement of the locking element and locking structure could be established. An assembled state of the first impingement device in the aerofoil represents a state of the turbine assembly when it is intended to work and in particular, a working state of the turbine assembly or the turbine, respectively. In the scope of an arrangement of the protrusion as "basically perpendicular" to a surface of a side wall should also lie a divergence of the protrusion in respect to the surface of the side wall of about 30°. A side wall of the first impingement device defines a wall extending along an axial direction of the first impingement device or the cavity, respectively, and which is located adjacent to the inner wall if the cavity. A surface of the side wall faces the inner wall of the cavity and is preferably arranged basically in parallel to the inner wall. A special advantage could be provided when the protrusion extends in a direction towards the inner wall.

In a further advantageous construction the locking structure of the inner wall is embodied as a recess, thus providing a space-saving structure. Preferably, the recess extends basically perpendicular to the inner surface of the inner wall, thus offering a structure balanced to match the orientation of the protrusion or the locking element of the first impingement device. Preferably, the protrusion and the recess have the same orientation. Moreover, a robust locking will be advantageously provided if the recess is formed integrally with the spacer. As the actual wall thickness of the inner wall is fairly thin only a few millimeters at most the locking element of the impingement device may rest onto the inner wall but will be trapped by the integral features or specifically, a recess in a spacer.

The properties of the first impingement device could be easily accomplished when the first impingement device is built from a metal sheet. Thus, the first impingement device is embodied as an impingement sheet or screen. Due to the construction of the first impingement device as a metal sheet manufactured such that it is larger i.e. wider than the space in which is shall fit inside the aerofoil it is enabled to change shape by spring effect compression during assembly in the cavity. Thus, assembly is effortlessly and the positioning is self-directed. The metal could be any metal feasible for a person skilled in the art with good mechanical properties and oxidation resistance at high temperatures as those arising in a gas turbine. Preferably, the metal is a nickel based alloy e. g. in the NIMONIC family, more specifically NIMONIC 75. The first impingement device or the metal sheet could have any shape i.e. cross section feasible for a person skilled in the art, for example the shape of the letters "U" or "V". Advantageously, the first impingement device is installed fully fabricated and machined; hence no final adjustment in situ is necessary.

In a further preferred embodiment the at least first impingement device has at least two side walls substantially joined in the span wise direction of the aerofoil, which, in the assembled state of the first impingement device in the cavity, are arranged in an acute angle towards each other. With this shape, the first impingement device could be advantageously embodied to fit into the cavity. The first impingement device or the base body, respectively, has the shape of the letter "V". In particular, the at least two side walls are arranged with an angle of approximately 5° to 45° and particularly, of about 15°. Consequently, the first impingement device mimics an inner contour of the cavity at its trailing edge.

In a preferred embodiment the at least first impingement device has two locking elements, thus providing a homogeneous locking. The locking elements may be both embodied as protrusions. Favourably, each locking element is arranged at an end of one side wall of the first impingement device. Due to this arrangement the locking elements could be processed easily by means of a bending of end regions of the side walls. Thus, the locking elements and the side walls are formed integrally with each other. Generally, it is also possible, that only one locking element is arranged at an end of a side wall and the other locking element at an arbitrary location of the first impingement device. Preferably, each end is located opposite to the acute angle; hence the locking elements are arranged at ends of flexible flanks and thus have sufficient mobility in a relaxing motion during assembly. An efficient locking could be provided when the locking elements or protrusion extend in contrariwise direction in respect to each other. Further, each locking element has a surface contact with the inner wall in the assembled state to form a proper force fit.

Furthermore, the turbine assembly comprises at least a platform arranged basically perpendicular to a span wise direction of the hollow aerofoil and covering at least the aperture partially. The platform could be embodied as an outer or an inner platform. Preferably, the turbine assembly has an outer and an inner platform arranged at opponent ends of the aerofoil(s). A span wise direction of the hollow aerofoil is defined as a direction extending basically perpendicular, preferably perpendicular between an outer and an inner platform.

Moreover, the turbine assembly comprises a gap arranged between the platform and the first impingement device, wherein at least a sealing element seals the gap between the platform and the first impingement device at least partially. By means of the sealing element a leakage of cooling medium around the first impingement device could advantageously be reduced. The described gap with specific location of the sealing element is further used to compensate for manufacturing tolerances in the casted aerofoil or vane segment. Precision casted aerofoil or vane segments are produced by using a core which forms the inside of the aerofoil. The positioning of the core may or will vary slightly which mean that the shape of the segment will also vary e. g. the wall thickness of the aerofoil may vary. In principle it would be possible to allow the side wall to extend all the way to the platform without the seal element. However, for the arrangement to have a low leakage the location of the core during manufacturing would have to be very close to nominal each time, which means that in reality the yield of the castings would be low and therefore increase the cost of the part. Moreover, by providing the sealing element, cooling medium is forced to impinge at the first impingement device. In this context "at least partially" means that the sealing element is at least constructed and/or positioned in such a way that it denies excess to the gap. The sealing element may be any structure feasible for person skilled in the art, like a rib cast on a surface of the platform, facing the cavity, or a resilient seal, e.g. a rope seal, positioned in the gap between the platform and the first impingement device.

In a further construction the at least first impingement device has an outer wall, wherein the outer wall has impingement holes for injecting cooling medium, which is fed through the aperture, as jets in a direction of the inner wall for impingement at an impingement area of the inner wall. Consequently, an efficient impingement cooling of the impingement area could be provided. An outer wall is intended to mean a wall which is basically arranged in parallel to the inner wall of the cavity and which has a surface facing the inner wall. The outer wall comprises at least the side walls of the first impingement device and preferably, the side walls built the outer wall.

In an alternative embodiment the turbine assembly comprises at least a clearance element, which is arranged at or in the at least first impingement device to provide a bypass which inhibits the cooling medium to eject through the impingement holes of the first impingement device. Due to this the cooling could be optimized in dependence of the used design of the component. By means of the bypass the cooling medium is directed around the impingement area. The clearance element could be any structure feasible for a person skilled in the art. For example the clearance element is embodied as the gap between the platform and the first impingement device. Moreover, the gap could be even increased at a top and/or a bottom in respect to a conventional design. Alternatively or additionally, the clearance element could be embodied as at least an aperture located in a part of the first impingement device representing a cone point of the acute angle. Thus, cooling medium guided via the aperture of the first impingement device could be easily directed to the non-impingement pin-fin/pedestal cooling region.

Alternatively the turbine assembly comprises at least a second impingement device. The at least second impingement device, referred to as second impingement device in the following description, could be any structure feasible for a person skilled in the art, and preferably it is a conventional impingement tube. Preferably, the second impingement devices extend substantially completely through a span of the hollow aerofoil.

The second aerofoil has an outer wall which is arranged basically in parallel to the inner surface of the inner wall of the cavity. The outer wall of the second impingement device has upstream impingement holes for injecting cooling medium, which is fed through the aperture of the aerofoil, as jets in a direction of the inner wall of the cavity for impingement at an upstream impingement area of the inner wall. The term "upstream" is intended to mean, that the impingement holes of the second impingement device and the impingement area of the inner wall located adjacent to the second impingement device are located upstream, view in a flow direction of the cooling medium in operation of the turbine assembly, in respect to the impingement holes of the first impingement device and the impingement area of the inner wall located adjacent to the first impingement device.

The cooling medium enters in an operating mode through the aperture the second impingement device. Then it is injected as jets through the upstream impingement holes in a space between the outer wall of the second impingement device and the inner wall of the cavity. There it impinges a first time at the upstream impingement area of the inner wall. Subsequently, the cooling medium enters the first impingement device thought an entrance constituted by the distance between the ends of the side walls. From there it is injected as jets through the impingement holes of the first impingement device in a space between the outer wall of the first impingement device and the inner wall of the cavity. There it impinges a second time at the impingement area of the inner wall adjacent to the first impingement device.

Due to this flow path an increased heat pick-up is provided and a lower mass flow of cooling medium is required. By tailoring the distribution and use of cooling medium inside the aerofoil, the cooling design could advantageously be further optimized. A required pressure drop from the aperture of the aerofoil to an outlet at a trailing edge for cooling could be maintained or even be reduced by such a design. Further the available pressure drop from the aperture of the aerofoil of the cooling medium to the trailing edge of the airfoil is utilized stepwise rather than in a continuous flow path as known for the prior art. Moreover, the cooling medium mass flow can be redistributed inside the airfoil more easily before it is "released" again. By all this it could be avoided, that the cooling effect from the impingement jet gradually deteriorates the further away it is from the upstream impingement holes. This is due to that the upstream exhausted impingement jets are transformed to a cross flow that reduces the impact of the downstream impingement jets on the cooled surface. The main cooling contribution is therefore gradually converted from impingement to convection along the cooled path of the component. To achieve a good convective cooling a certain velocity is required which corresponds to a certain mass flow. Taken together this can lead to increased cooling medium mass flow and not fully utilised heat pick up by the cooling medium. In turn this reduces the potential efficiency for the gas turbine as more cooling medium than necessary is spent on cooling rather than producing hot gases which can to a higher degree be converted to mechanical work during its expansion though the turbine.

In an alternative embodiment the second impingement device comprises an opening, which is arranged at a side of the second impingement device which is oriented towards the first impingement device or at a trailing edge part of the second impingement device, respectively. The opening provides an upstream bypass, which inhibits the cooling medium to eject through the upstream impingement holes. Thus, a portion of the cooling medium may be injected directly into the first impingement device. This bypass reduces the temperature of the cooling medium before it is used as impingement cooling for the impingement area adjacent to the first impingement device. As in all heat transfer the temperature difference between the cooling and heating medium affects the heat flux and hence the cooling effectiveness.

Furthermore, the at least first impingement device is arranged in a part of the cavity which is oriented towards the trailing edge of the hollow aerofoil. This is approximately a middle section of the aerofoil. Due to this location, a second wave of impingement cooling is located in the region where the highest external heat load is expected. Moreover, the second impingement device is arranged in a part of the cavity which is oriented towards a leading edge of the hollow aerofoil, thus providing a proper alignment with the aperture of the aerofoil and consequently an unhindered entry for the cooling medium into the aerofoil. The second impingement device may have substantially the same contour as the inner wall of the leading edge part of the cavity.

To provide the turbine assembly with a flow path for the cooling medium and thus with good cooling properties, the hollow aerofoil comprises at least a spacer at the inner surface of the inner wall to hold the impingement devices at a predetermined distance to said surface of the hollow aerofoil. This also provides a satisfactory alignment of the first and second impingement devices in the aerofoil. The spacer is preferably embodied as a protrusion or a locking pin or a rib for easy construction and a straight seat of the impingement tube.

In a further advantageous embodiment the hollow aerofoil is a turbine blade or vane, for example a nozzle guide vane.

Embodiments of the present invention also provide a method for assembling the impingement device in the basically hollow aerofoil of the turbine assembly.

Said method comprises: Preloading the impingement device in a form for insertion; inserting the impingement device through the aperture of the hollow aerofoil into the cavity; manoeuvring of the impingement device into position inside the cavity; and relaxing the impingement device so that the at least one locking element of the impingement device being embodied as the protrusion establishes a force fit between the at least one locking element and the inner wall of the cavity with the protrusion extending basically perpendicular to the surface of the side wall of the at least first impingement device in the direction towards the inner wall and locking the impingement device in the cavity into position thereby.

Due to the inventive method a turbine assembly could be provided, which could be assembled effortlessly. This is especially facilitated by an impingement device with at least a locking element which could be easily locked in the hollow aerofoil. Consequently, no additional pieces are needed to fasten this first impingement device into place or position. Hence, costs for parts and assembly could be spared. Moreover, complex mechanisms for positioning and clamping of the first impingement device are avoided. Further, an alignment of the first impingement device in the aerofoil could be accomplished without high constructive efforts.

The phrase "manoeuvring into position" is intended to mean a process mediated via an active mechanism, where an external force is used for the positioning. Advantageously, the impingement device is fitted in a predefined shape before the insertion in the cavity of the hollow aerofoil. In a last step a second impingement device may be inserted into the hollow aerofoil adjacent to the first impingement device through the aperture of the hollow aerofoil and manoeuvred into position in the hollow aerofoil.

The above-described characteristics, features and advantages of this invention and the manner in which they are achieved are clear and clearly understood in connection with the following description of exemplary embodiments which are explained in connection with the drawings.

BRIEF DESCRIPTION OF THE DRAWINGS

Embodiments of the present invention will be described with reference to drawings in which:

FIG. 7: shows schematically an inserting and a manoeuvring steps of a method for an assembly of the impingement device from FIG. 1 inside a cavity of the aero foil, FIG. 8: shows schematically an locking step of the impingement device from FIG. 1 and an inserting step of the second impingement device from FIG. 2 of the method from FIG. 7, FIG. 9 shows a cross section through an aerofoil with an inserted alternatively embodied second impingement device, FIG. 10: shows a part of a turbine assembly with a first alternatively embodied in span wise direction enlarged impingement device, FIG. 11: shows a part of a turbine assembly with a second alternatively embodied impingement device without a sealing element, FIG. 12: shows a part of a turbine assembly with a third alternatively embodied impingement device with a clearance element and FIG. 13: shows a part of a turbine assembly with a forth alternatively embodied impingement device with an alternative clearance element.

DETAILED DESCRIPTION OF THE ILLUSTRATED EMBODIMENTS

In the present description, reference will only be made to a vane, for the sake of simplicity, but it is to be understood that the invention is applicable to both blades and vanes of a turbine.

Figure 1:
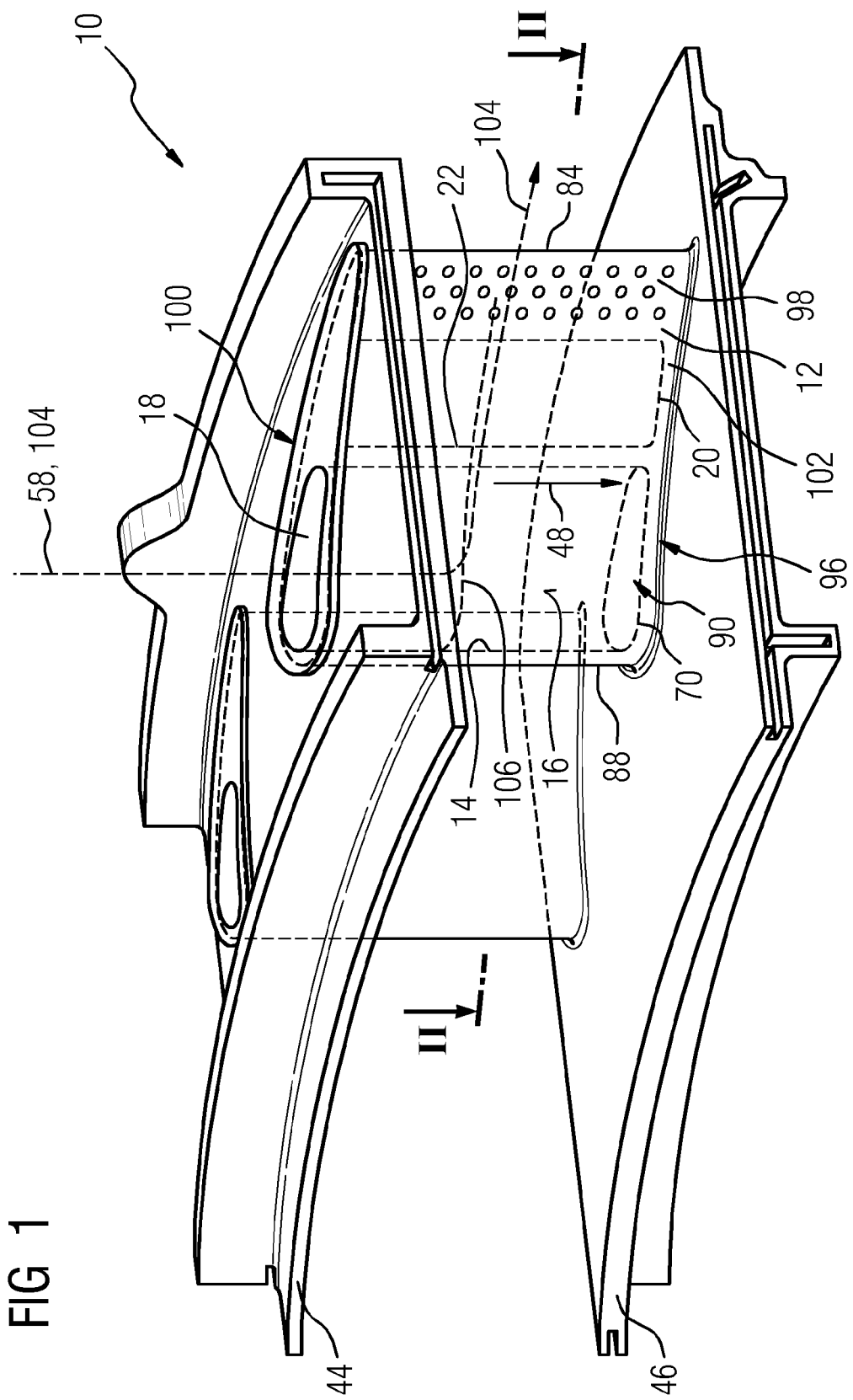
FIG. 1: shows a perspective view of a turbine assembly with an impingement device according to the invention inserted into an aerofoil.

FIG. 1 shows in a perspective view a turbine assembly 10, particularly a gas turbine assembly. The turbine assembly 10 comprises a basically hollow aerofoil 12, embodied as a vane 90, having a cavity 14 with an inner wall 16, wherein the latter builds an outer perimeter of the cavity 14. Moreover, the aerofoil 12 has an aperture 18 providing access to the cavity 14. Further, the aerofoil 12 has two cooling regions, specifically, an impingement cooling region 96 and a fin-pin/pedestal cooling region 98. The former is located at a leading edge 88 as well as in a middle section 100 and the latter at a trailing edge 84 of the aerofoil 12. An outer platform 44 and an inner platform 46 are arranged perpendicular to a span wise direction 48 of the hollow aerofoil 12 and are positioned on opposed ends of the aerofoil 12. The outer platform 44 covers the aperture 18 partially, thus forming an aperture aligned with the uncovered part of the aperture 18. The uncovered part of the aperture 18 is arranged at a side of the impingement cooling region 96 oriented towards the leading edge 88 of the aerofoil 12 (Alternatively or additionally the inner platform 46 could also have an aperture aligned with an uncovered part of the aperture 18, not shown). In a circumferential direction of a not shown turbine cascade several aerofoils 12 could be arranged, wherein all aerofoils 12 where connected with one another through the inner and the outer platforms 44, 46.

A casing 102 of the hollow aerofoil 12 forms the cavity 14 in the impingement cooling region 96. In an assembled state of the turbine assembly 10 a first impingement device 20 and a second impingement device 70 are arranged inside the cavity 14 for cooling purposes. The first and second impingement device 20, 70 extend in span wise direction 48 completely through a span of the hollow aerofoil 12. Further, during an operation of the turbine assembly 10 the first and second impingement device 20, 70 provide a flow path 104 for a cooling medium 58, like air. At an inner surface 34 of the inner wall 16 of the cavity 14 it comprises a number of spacers 106 to hold the first and second impingement device 20, 70 at a predetermined distance to this surface 34. The spacers 106 are formed integrally with the inner wall 16 and are embodied as protrusions or ribs, which extend perpendicular to the span wise direction 48 (see also FIG. 4). Other functions of the spacers 106 are to strengthen the wall of the aerofoil 12 and to provide heat transfer via convection to reduce the temperature of the wall.

Figure 2:
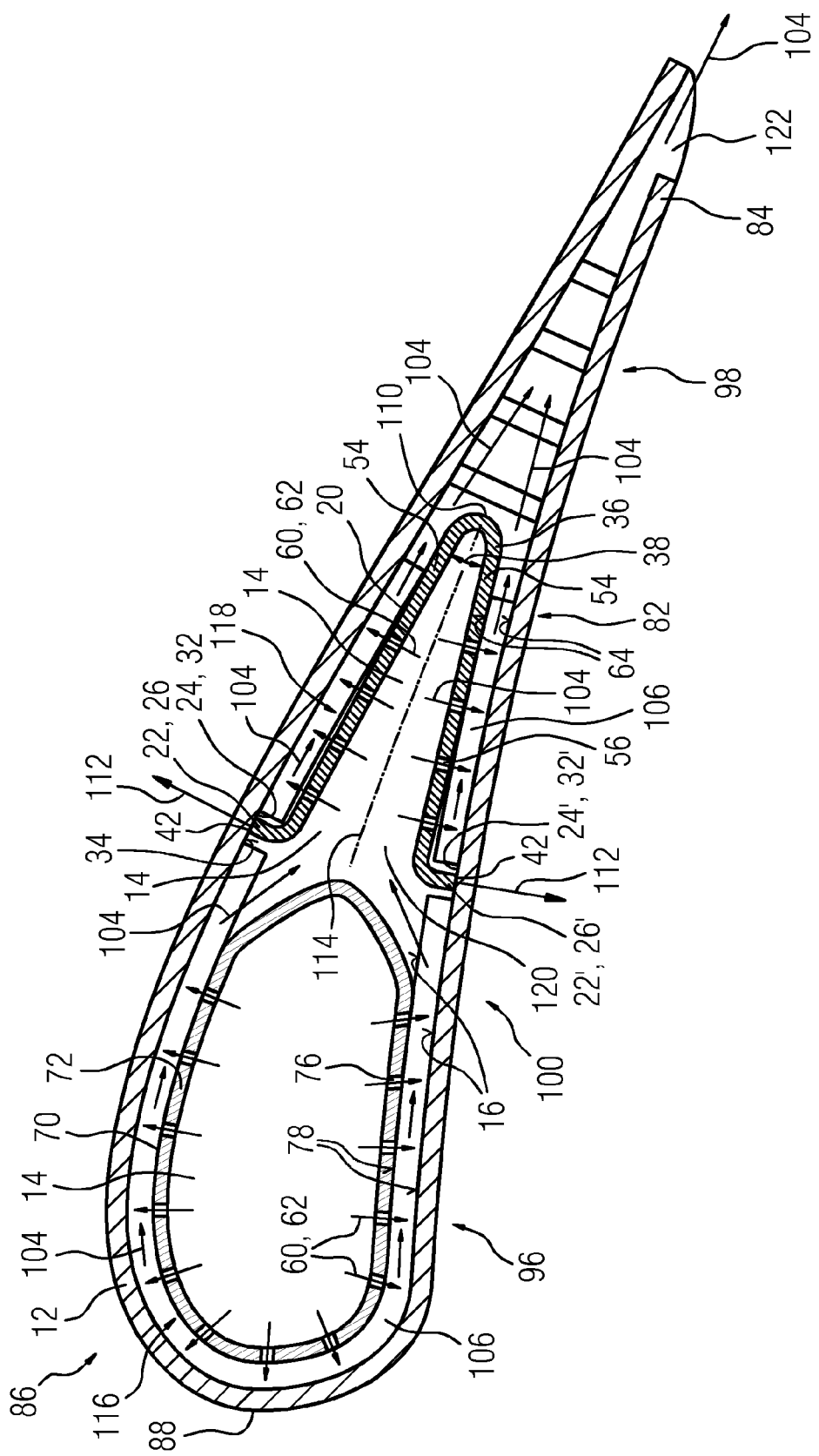
FIG. 2: shows a cross section along line II-II in FIG. 1 depicting the inserted impingement device from FIG. 1 and a second inserted impingement device.

In FIG. 2 a cross section along line II-II in FIG. 1 is shown. The second impingement device 70 is arranged in a part 86 of the cavity 14 which is oriented towards the leading edge 88 of the aerofoil 12. Further, it is embodied as a conventional impingement tube. The first impingement device 20 is arranged in a part 82 of the cavity 14 which is oriented towards the trailing edge 84 of the aerofoil 12. Furthermore, the first impingement device 20 is self-locking, resilient and preloadable and has two locking elements 22, 22' to lock the first impingement device 20 in place in the cavity 14. The locking is facilitated via a force fit between the two locking elements 22, 22' and the inner wall 16 of the cavity 14 for sealing purposes. The locking elements 22, 22' rest on the downstream spacers 106 for positioning inside the cavity 14. Alternatively in a different design the first impingement device could rest on the first row of fin-pin/pedestals for positioning (not shown).

Figure 3:
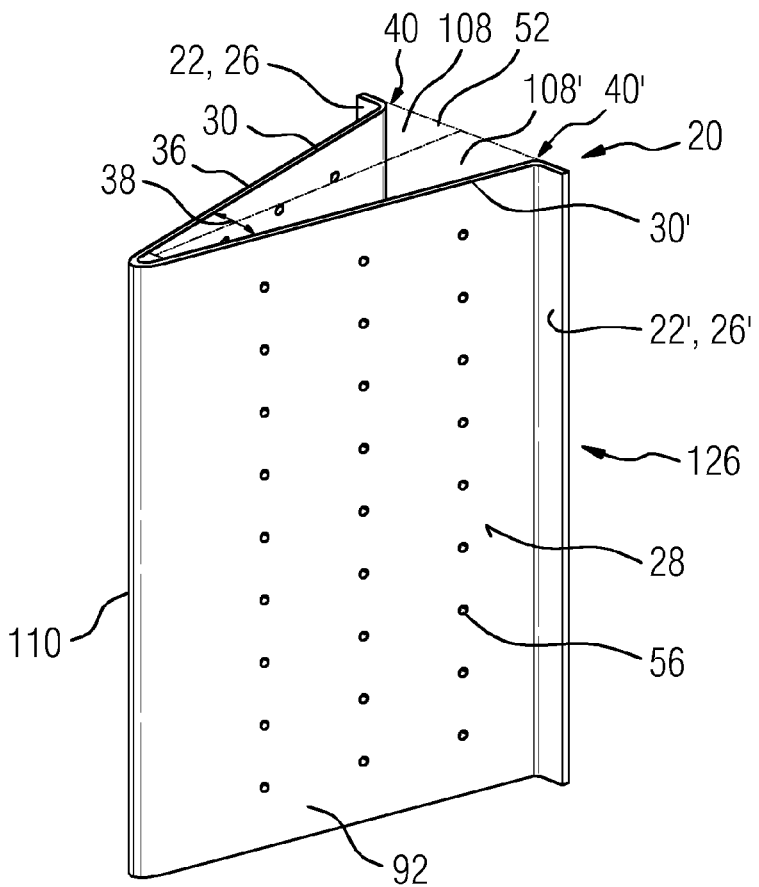
FIG. 3: shows the impingement device from FIG. 1 in detail.
Figure 5:
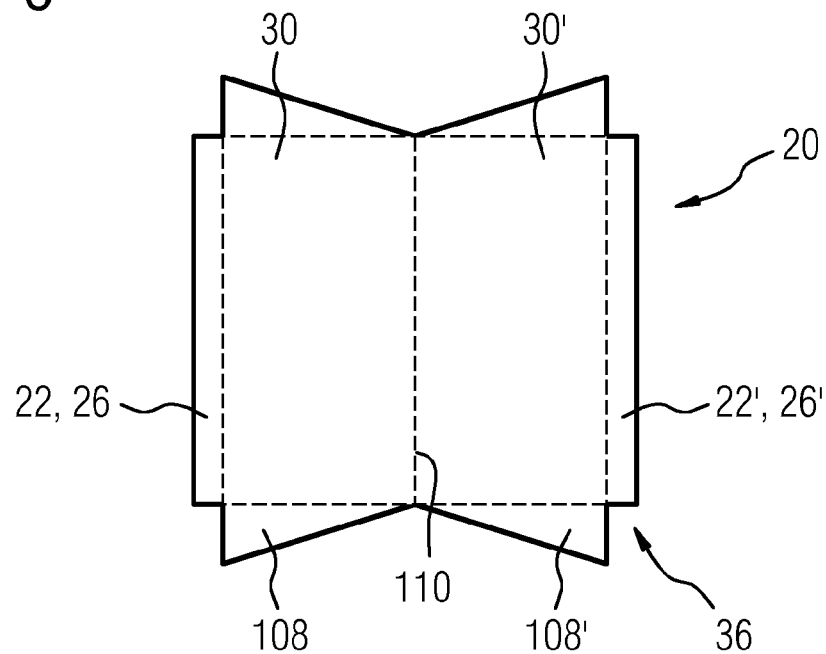
FIG. 5: shows schematically a shape of a cut metal sheet used to form the impingement device from FIG. 3, FIG. 6: shows a top view of the outer platform from FIG. 4 with an aperture and the aerofoil from FIG. 1 beneath and the preloaded impingement device before an insertion through the aperture.

FIG. 3 shows the first impingement device 20 in detail. The impingement device 20 is built from a metal sheet 36 out of Nimonic 75 and thus is embodied as an impingement sheet or screen. FIG. 5 shows schematically the shape of the sheet metal cut out 36 used to form the first impingement device 20. The first operation is to machine the impingement holes 56 in the metal sheet 36. In a further step end regions at ends 40, 40' of side walls 30, 30' are bent to form the locking elements 22, 22' or the protrusions 26, 26', respectively. Thus, the locking elements 22, 22' and the side walls 30, 30' are formed integrally with each other. This is followed by the step where triangular sections 108, 108' at ends of the metal sheet 36 are bent at an approximately straight angle against side walls 30, 30' (see FIG. 3, where the triangular sections 108, 108' are only shown schematically). In the concluding step of fabrication the metal sheet 36 is bent along a line or a curve forming the side walls 30, 30'. At the curve or kink a cone point 110 of an acute angle 38 is built. The angle should be larger than the space available inside the cavity 14 in order for it to press against the inner wall 16 when installed. The triangular folded sections 108, 108' at the end of the side walls 30, 30' will now touch or slight overlap when the side walls 30, 30' are compressed together.

Returning to FIG. 3, the first impingement device 20 has a base body 92, which comprises the two side walls 30, 30' extending along a main extension of the first impingement device 20, lying in an axis of symmetry 114 of the first impingement device 20. The side walls 30, 30' are arranged in an acute angle 38 of about 15° towards each other and are embodied as flexible flanks, which are connected to each other via the cone point 110 of the acute angle 38. Thus, a cross section of the first impingement device 20 or the base body 92, respectively, has a shape of the letter "V". At the end 40, 40' of each side wall 30, 30', wherein the ends 40, 40' are located opposite to the acute angle 38, is, in each case, a locking element 22, 22' arranged. Each locking element 22, 22' is embodied as a protrusion 26, 26', which is oriented in a direction 112 which deflects with an angle of more than 60° from the main extension of the first impingement device 20 (see FIG. 2). Specifically, each protrusion 26, 26' is oriented basically perpendicular to a surface 28 of the side walls 30, 30'. Further, the two protrusions 26, 26' extend in contrariwise direction in respect to each other (see also FIG. 2). It is important that the angle 38 does not significantly exceed approximately 90° as this could cause the first impingement device 20 to slide out of the locking position by the resulting force from the pressure drop across the first impingement device 20.

To facilitate the locking between the locking elements 26, 26' and the inner wall 16, the latter has two locking structures 24, 24', which each is embodied as a recess 32, 32' in the spacer 106 extending basically perpendicular to the inner surface 34 of the inner wall 16. Hence, the locking elements 22, 22' and the locking structures 24, 24' engage with each other via a form fit. In an assembled state of the first impingement device 20 in the cavity 14 the side walls 30, 30' are arranged in parallel to the inner wall 16 and the surface 28 of each side wall 30, 30' faces the inner wall 16. Moreover, the protrusions 26, 26' extend in a direction towards the inner wall 16. Thus, each locking element 22, 22' has a surface contact 42 with the inner wall 16 and the spacer 106 in the assembled state. Not shown in this view in a preferable embodiment is a vertical spacer 106 which extends in span wise direction 48 along a length of the first impingement device 20 against which the locking elements 22, 22' may rest and seal in position.

The first and second impingement device 20, 70 are, e.g. due to the spacers 106, arranged in such a way, that spaces 116, 118 are formed between an outer wall 72 of the second impingement device 70 and the inner wall 16 as well as between an outer wall 54 of the first impingement device 20 and the inner wall 16 of the cavity 14. Both impingement devices 20, 70 or their outer walls 54, 72, respectively, have impingement holes 56, 76 for injecting cooling medium 58, which is fed through the aperture 18. The impingement holes 76 of the second impingement device 70 are upstream impingement holes 76 due to their arrangement upstream of the impingement holes 56 of the first impingement device 20, view in a direction of the flow path 104 of the cooling medium 58 in operation of the turbine assembly 10. The cooling medium 58 is, in both cases, injected as jets 60 in a direction 62 towards the inner wall 16 for impingement at impingement areas 64, 78 of the inner wall 16 or the spacer 106, respectively. The impingement area 78 is located adjacent to the second impingement device 70 and the impingement area 64 adjacent to the first impingement device 20. Further, the impingement area 78 is an upstream impingement area 78 due to its upstream location in respect to the impingement area 64.

The flow path 104 of the cooling medium 58 is as follows: The cooling medium 58 enters in operating mode through the aperture 18 the second impingement device 70. Then it is injected as jets 60 through the upstream impingement holes 76 in the space 116 between the outer wall 72 of the second impingement device 70 and the inner wall 16 of the cavity 14. There it impinges a first time at the upstream impingement area 78 of the inner wall 16 or the spacer 106. Subsequently, the cooling medium 58 enters the first impingement device 20 thought an entrance 120 built between the ends 40, 40' of the side walls 30, 30'. From there it is injected as jets 60 through the impingement holes 56 of the first impingement device 20 in the space 118 between the outer wall 54 of the first impingement device 20 and the inner wall 16 of the cavity 14. There it impinges a second time at the impingement area 64 of the inner wall 16 adjacent to the first impingement device 20 or the spacer 106. From the space 118 the cooling medium 58 flows through the fin-pin/pedestal cooling region 98 and exits the aerofoil 12 at an outlet 122 at its trailing edge 84.

Figure 4:
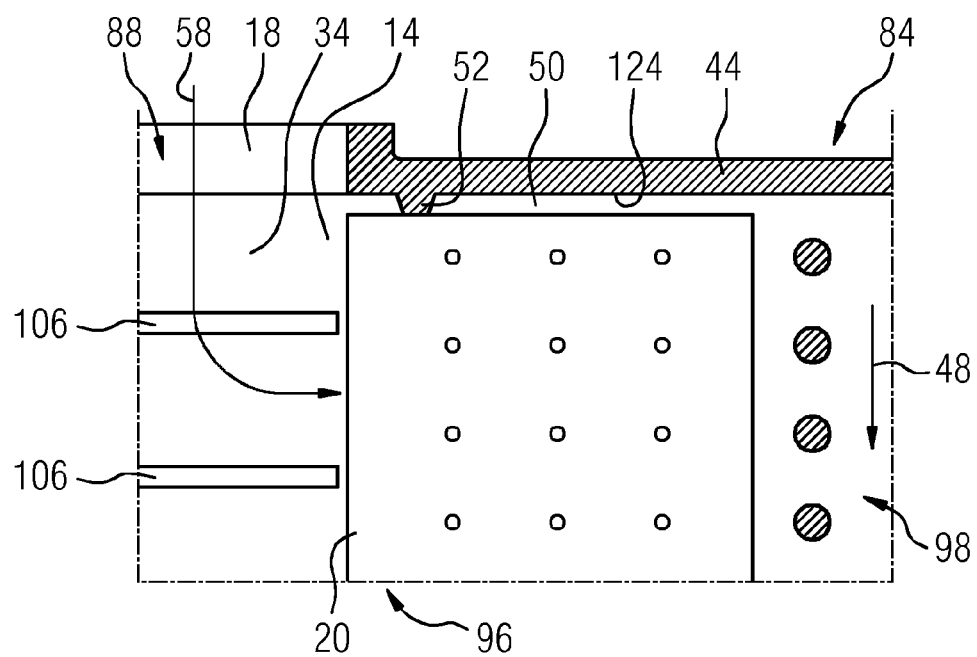
FIG. 4: shows a part of the turbine assembly with a sealing element arranged between an outer platform and the impingement device.

As shown in FIG. 4 the turbine assembly 10 comprise a gap 50 arranged between the outer platform 44 and the first impingement device 20. An additional gap 50 could be provided between the inner platform 46 and the first impingement device 20 (not shown). At the leading edge 88 side of the gap 50 a sealing element 52 is arranged. The sealing element 52 seals the gap 50. Due to the sealing element 52 cooling medium 58, which flows from the aperture 18 towards the trailing edge 84, can't bypass the first impingement device 20. The sealing element 52 is embodied as a rib extending in a direction perpendicular to the span wise direction 48 over the whole width of the aperture 18 covered by the outer platform 44. Further, it is cast on a surface 124 of the outer platform 44, facing the cavity 14. Thus, the sealing element 52 and the outer platform 44 are formed integrally with each other. In addition, the triangular folded sections 108, 108' of the first impingement device 20 build additional sealing elements 52 which prevent the cooling medium 58 from bypassing the impingement holes 56.

Figure 6:
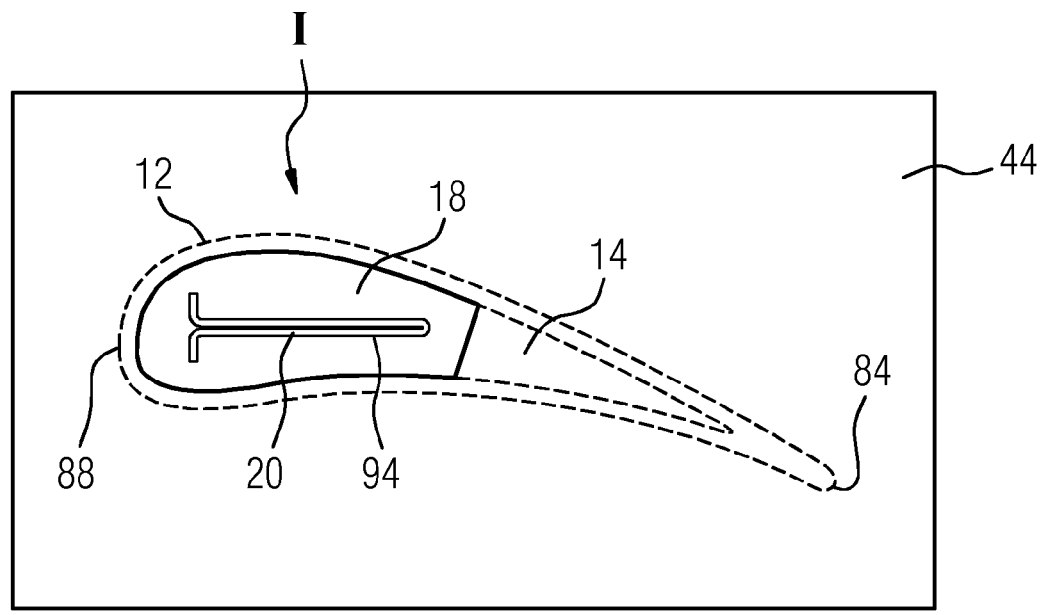

Subsequently, a method for an assembly of the turbine assembly 10 is described with reference to FIGS. 6 to 8. Beforehand of the insertion of the first impingement device 20 in the cavity 14 of the aerofoil 12 it is in a predefined shape 126 (see FIG. 3). In a first assembly step shown in FIG. 6 the first impingement device 20 is preloaded in an exaggerated form 94 for illustration purposes for insertion (I). Specifically, the first impingement device 20 is compressed in a direction perpendicular to the axis of symmetry 114 so that the distance between the side walls 30, 30' is reduced. FIG. 6 shows the compressed first impingement device 20 positioned over the aperture 18 before the insertion. The following assembly steps are depicted in FIG. 7. There the compressed first impingement device 20 is inserted through the aperture 18 of the hollow aerofoil 12 into the cavity 14 (II) and then manoeuvred into position inside the cavity 14 (III). The manoeuvring could e.g. be performed by a manually applied force.

After reaching the intended position, as could be seen in FIG. 8, the compressed first impingement device 20 is relaxed so that the locking elements 22, 22' of the first impingement device 20 establish a force fit between the locking elements 22, 22' and the inner wall 16 of the cavity 14 (IV) or the spacer 106, respectively. Thereby, the first impingement device 20 is locked into position in the cavity 14 (V). In a final step the second impingement device 70 is inserted into the aerofoil 12 adjacent to the first impingement device 20 through the aperture 18 of the aerofoil 12 and manoeuvred into position in the aerofoil 12 (VI).

In FIGS. 9 to 13 alternative embodiments of the first impingement device 20 and the second impingement device 70 are shown. Components, features and functions that remain identical are in principle substantially denoted by the same reference characters. To distinguish between the embodiments, however, the letters "a" to "d" have been added to the different reference characters of the embodiments in FIGS. 9 to 13. The following description is confined substantially to the differences from the embodiment in FIGS. 1 to 8, wherein with regard to components, features and functions that remain identical reference may be made to the description of the embodiment in FIGS. 1 to 8.

FIG. 9 shows a cross section through an aerofoil 12 analogously formed as in FIGS. 1 to 8 with an alternatively embodied second impingement device 70a. The embodiment from FIG. 9 differs in regard to the embodiment according to FIGS. 1 to 8 in that the second impingement device 70a has at least one aperture 74 arranged in the side of the second impingement device 70a which is oriented toward the first impingement device 20 or its entrance 120. The aperture 74 provides an upstream bypass 80, which inhibits the cooling medium 58 to eject through the upstream impingement holes 76. Thus, the cooling medium 58 entering through an aperture 18 into the second impingement device 70a is injected directly into the cut 120 of the first impingement device 20.

In FIG. 10 an alternatively embodied first impingement device 20a assembled in an alternative turbine assembly 10a is shown. The embodiment from FIG. 10 differs in regard to the embodiment according to FIGS. 1 to 8 in that the turbine assembly 10a comprises no gap arranged between an outer platform 44a and the first impingement device 20a. Therefore, the impingement device 20a is enlarged in span wise direction 48 and abuts a surface 124a of the outer platform 44a. Such a construction could also be possible between an inner platform and the first impingement device 20a (not shown). Consequently, as side wall edges seal against the platform 44a directly, there is no need to embody the first impingement device 20a with triangular sections at ends of side walls 30 of the first impingement device 20a. In a further, not shown embodiment it could be possible to cast a rib in the platform that followed the shape of the impingement device such that when installed it rested against the rib. The efficiency of the seal would again depend on tolerances but would be an improvement over the platform without the rib that only had contact with the edge of the side wall.

FIG. 11 shows a second alternatively embodied first impingement device 20b assembled in an alternative turbine assembly 10b. The embodiment from FIG. 11 differs in regard to the embodiment according to FIGS. 1 to 8 in that the turbine assembly 10b comprises a clearance element 66 which is arranged at the first impingement device 20b to provide a bypass 68 which inhibits the cooling medium 58 to eject through the impingement holes 56 of the first impingement device 20b. The clearance element 66 is represented by a gap 50b between an outer platform 44b and the first impingement device 20b. Such a construction could also be possible between an inner platform and the first impingement device 20b (not shown).

In FIG. 12 a third alternatively embodied first impingement device 20c assembled in an alternative turbine assembly 10c is shown. The embodiment from FIG. 12 differs in regard to the embodiment according to FIG. 11 in that the as gap 50c embodied clearance element 66 could be even increased at a top and/or a bottom of the first impingement device 20c in respect to the design shown in FIG. 4 or 11.

FIG. 13 shows a forth alternatively embodied first impingement device 20d assembled in an alternative turbine assembly 10d with an alternative clearance element 66. The clearance element 66 is arranged in the first impingement device 20d and is embodied as an aperture 128 arranged in the first impingement device 20d at a cone point 110 of an acute angle 38 of the first impingement device 20d. Generally more than one aperture 128 could be provided.

Alternatively, the clearance element could be arranged at the triangular folded sections. They could, for example, be embodied as an intentional clearance between ends of the triangular folded sections, wherein the ends face each other. It would also be possible to embody them with a cut out at a tip of the triangular sections near the cone point (not shown).

Although the invention is illustrated and described in detail by the preferred embodiments, the invention is not limited by the examples disclosed, and other variations can be derived therefrom by a person skilled in the art without departing from the scope of the invention.

The invention claimed is:

1. A turbine assembly comprising
an aerofoil, comprising a cavity with an inner wall and comprising an aperture providing access to the cavity, and
a first impingement device arrangeable within the cavity, wherein the first impingement device is self-locking, resilient and preloadable and comprises two locking elements to lock the first impingement device in place in the cavity via a force fit between each one of the two locking elements and the inner wall of the cavity wherein
the first impingement device comprises at least two side walls with
the two locking elements of the first impingement device are embodied as protrusions each processed by a bending of an end region of the side walls with an angle of 90°+/−30° to a surface of each side wall, wherein the surface faces the inner wall and is arranged in parallel to the inner wall, therefore each protrusion extends in an assembled state of the first impingement device in the cavity with an angle of 90°+/−30° to the surface of each side wall of the first impingement device towards the inner wall,
the turbine assembly further comprising a second impingement device disposed in the cavity, the second impingement device comprising an outer wall comprising upstream impingement holes configured to inject cooling medium as jets towards the inner wall for impingement at an upstream impingement area of the inner wall,
wherein the aerofoil is configured to direct the cooling medium into the second impingement device, and then to direct the cooling medium previously injected as jets from the second impingement device into the first impingement device.

2. The turbine assembly according to claim 1, wherein
the inner wall comprises a locking structure and
wherein each locking element of the first impingement device and a respective locking structure of the inner wall engage with each other via a form fit.

3. The turbine assembly according to claim 2, wherein
the locking structure of the inner wall is embodied as a recess extending perpendicular to an inner surface of the inner wall.

4. The turbine assembly according to claim 2, further comprising:
at least one of vertically oriented spacers and horizontally oriented spacers in an inner wall of the aerofoil configured to hold the first impingement device at a predetermined distance from the inner wall; and
recesses in the spacers,
wherein the locking structures comprises the recesses.

5. The turbine assembly according to claim 1, wherein
the first impingement device is built from a metal sheet.

6. The turbine assembly according to claim 1, wherein
in the assembled state of the first impingement device in the cavity, the at least two side walls are arranged in an acute angle towards each other.

7. The turbine assembly according to claim 1, further comprising
a platform arranged perpendicular to a span wise direction of the aerofoil and covering the aperture at least partially, and comprising a gap arranged between the platform and the first impingement device,
wherein a sealing element seals the gap between the platform and the first impingement device at least partially.

8. The turbine assembly according to claim 1, wherein
the first impingement device comprises a first outer wall, wherein the first outer wall comprises impingement holes for injecting cooling medium, which is fed through the aperture, as jets towards the inner wall for impingement at an impingement area of the inner wall.

9. The turbine assembly according to claim 1, further comprising
a clearance element, which is arranged at or in the first impingement device to provide a bypass which inhibits the cooling medium to eject through impingement holes of the first impingement device.

10. The turbine assembly according to claim 1, further comprising
an aperture in the second impingement device,
wherein the aperture provides an upstream bypass located upstream of the first impingement device which inhibits the cooling medium to eject through the upstream impingement holes and which aims the cooling medium into the first impingement device.

11. The turbine assembly according to claim 1, wherein the first impingement device is arranged in a part of the cavity which is oriented towards a trailing edge of the aerofoil and the second impingement device is arranged in a part of the cavity which is oriented towards a leading edge of the aerofoil.

12. The turbine assembly according to claim 1, wherein the aerofoil is a turbine blade or vane.

13. The turbine assembly according to claim 1, wherein the first impingement device comprises at least two side walls, which, in the assembled state of the first impingement device in the cavity, are arranged in an acute angle towards each other with an angle of 5° to 45°.

14. The turbine assembly according to claim 1, wherein the first impingement device comprises at least two side walls, which, in the assembled state of the first impingement device in the cavity, are arranged in an acute angle towards each other with an angle of about 15°.

15. The turbine assembly according to claim 1, further comprising at least one of vertically oriented spacers and horizontally oriented spacers in an inner wall of the aerofoil.

16. The turbine assembly according to claim 1, further comprising at least one of vertically oriented spacers and horizontally oriented spacers in an inner wall of the aerofoil configured to hold the first impingement device at a predetermined distance from the inner wall.

17. The turbine assembly according to claim 1, wherein the bends are outward, wherein the angle is 90°, wherein each protrusion comprises opposite surfaces and an end surface spanning the opposite surfaces, and wherein each end surface abuts the inner wall.

18. A method for assembling an impingement device in a cavity of an aerofoil of a turbine assembly according to claim 1, the method comprising:
preloading the impingement device in a form for insertion;
inserting the impingement device through an aperture in a platform of the aerofoil into the cavity;
maneuvering of the impingement device rearward toward a trailing edge of the airfoil and into position inside the cavity and under the platform;
relaxing the impingement device so that two locking elements of the impingement device, each being embodied as a protrusion and being each processed by a bending of an end region of one of the two side walls of the impingement device with an angle of 90°+/−30° to a surface of each side wall, wherein the surface faces an inner wall of the cavity and is arranged in parallel to the inner wall, establish a force fit between the two locking elements and the inner wall of the cavity with each protrusion extending with an angle of 90°+/−30° to the surface of each side wall of the first impingement device in a direction towards the inner wall;
locking the impingement device in the cavity into position thereby, and
inserting a second impingement device into the cavity, the second impingement device comprising an outer wall comprising upstream impingement holes configured to inject cooling medium as jets towards the inner wall for impingement at an upstream impingement area of the inner wall,
wherein the aerofoil is configured to direct the cooling medium injected as jets from the second impingement device into the first impingement device.

19. A turbine assembly comprising
an aerofoil, comprising: a cavity; an aperture providing access to the cavity; and an inner wall comprising locking structures, and
a first impingement device configured to fit through the aperture and to fit within the cavity and comprising: two side walls each comprising a surface that faces the inner wall and is arranged in parallel to the inner wall; and two locking elements configured to lock the first impingement device in place in the cavity via a force fit between each one of the two locking elements and the locking structures, wherein the first impingement device forms a V-shape or U-shape comprising an open end oriented toward a leading edge of the aerofoil and configured to receive a cooling medium, and a point oriented toward a trailing edge of the aerofoil;
wherein the two locking elements are embodied as protrusions directed towards the inner wall, each processed by a bending of an end region of the side walls with an angle of 90°+/−30° to the surface of each side wall,
wherein a resilience of the first impingement device urges the protrusions toward the locking structures, thereby locking the protrusions into the locking structures, and
wherein the aerofoil is configured to flow the cooling medium from the cavity into the open end of the first impingement device via an entrance that is at least partly bounded by the end regions of the side walls.

20. The turbine assembly of claim 19, further comprising an outer platform and an inner platform arranged perpendicular to a span wise direction of the aerofoil and positioned on opposed ends of the aerofoil, wherein the first impingement device is spaced apart from and disposed between the outer platform and the inner platform.

* * * * *